US007009461B2

(12) United States Patent
Reichelt

(10) Patent No.: US 7,009,461 B2
(45) Date of Patent: Mar. 7, 2006

(54) PHASE SHIFTED BINARY TRANSMISSION ENCODER, A PHASE MODULATOR, AND AN OPTICAL NETWORK ELEMENT FOR ENCODING PHASE SHIFTED BINARY TRANSMISSION

(75) Inventor: Hans-Joachim Reichelt, Berlin (DE)

(73) Assignee: Alcatel, Paris (FR)

( * ) Notice: Subject to any disclaimer, the term of this patent is extended or adjusted under 35 U.S.C. 154(b) by 106 days.

(21) Appl. No.: 10/662,380

(22) Filed: Sep. 16, 2003

(65) Prior Publication Data

US 2004/0075509 A1 Apr. 22, 2004

(30) Foreign Application Priority Data

Oct. 21, 2002 (EP) ................................. 02360288

(51) Int. Cl.
*H03C 3/00* (2006.01)

(52) U.S. Cl. .......................... 332/104; 332/103; 327/5; 327/218

(58) Field of Classification Search ................ 332/104, 332/103; 327/5, 243, 218; 398/188; 385/3; 375/308

See application file for complete search history.

(56) References Cited

U.S. PATENT DOCUMENTS

| | | | | |
|---|---|---|---|---|
| 6,108,777 | A * | 8/2000 | Puziol et al. | 712/240 |
| 6,195,769 | B1 * | 2/2001 | Prickett | 714/49 |
| 6,263,422 | B1 * | 7/2001 | Wise et al. | 712/209 |
| 2002/0196064 | A1 * | 12/2002 | Kojima et al. | 327/218 |

OTHER PUBLICATIONS

Patent Abstracts of Japan, vol. 1997, No. 9, Sep. 30, 1997 & JP 09 128109 A (Oki Electric Ind Co Ltd.) May 16, 1997.

* cited by examiner

*Primary Examiner*—Joseph Chang
(74) *Attorney, Agent, or Firm*—Sughrue Mion, PLLC

(57) ABSTRACT

The invention relates to a phase shifted binary transmission encoder with data input and data output, where the phase shifted binary transmission encoder includes an exclusive or gate having two inputs and one output, the output of the exclusive or gate being the output of the Phase shifted binary transmission encoder, where one input of the exclusive or gate is connected with the output via a first delaying element and the other input of the exclusive or gate is connected with the data input via a second delay element, both delaying elements being connected with a clock input, wherein the delay elements are transparent D flip-flops. Furthermore the invention relates to a phase modulator and an optical network element for phase shaped binary transmission.

3 Claims, 7 Drawing Sheets

PHASE SHIFTED BINARY TRANSMISSION ENCODER, A PHASE MODULATOR, AND AN OPTICAL NETWORK ELEMENT FOR ENCODING PHASE SHIFTED BINARY TRANSMISSION

BACKGROUND OF THE INVENTION

1. Field of the Invention

The present invention relates to a phase modulator for frequencies higher than 10 GHz. More precisely the invention relates to a phase shifted binary transmission encoder including an exclusive or gate and flip-flops.

The present invention is based on a priority application, EP 02360288.1, which is hereby incorporated by reference.

2. Background

Optical networks face increasing bandwidth demands and diminishing fiber availability. Based on the emergence of the optical layer in transport network optical networks provide higher capacity and reduced cost. As with any new technology, many challenges arise. Higher spectral densities require a modulated signal spectrum to be narrowed to leave room for filtering. Therefore research is conducted on new modulation formats that combine good transmission properties with higher spectral efficiency. The so-called Phase Shifted Binary Transmission (PSBT), based on a combination of amplitude and phase modulation, doubles tolerance to chromatic dispersion and halves the spectrum width of individual channels.

Implementing PBST requires fast phase modulators. As input of a phase modulator a signal coded in phase shifted binary transmission (PSBT) mode is necessary.

In order to realize such modulation fast circuitries are need encoding a binary signal. A phase modulation or phase shift keying is a modulation where frequency and amplitude are both kept constant. However, the phase of the signal is shifted to signify logic 0 and 1.

The encoding principle to be realized by this invention is shown in FIG. 1. There a time diagram is shown illustrating the coding. A binary data stream In-Th has to be encoded into an binary output data stream Out-Th. The output stream has to change its logical value whenever the input stream is on logic 1. The figure shows the encoding of the bit sequence 0100110. The vertical dashed lines frame the duration of an input bit. The "ones" are changing the output level from 1 to 0 or from 0 to 1.

FIG. 2 shows two prior art circuitries for phase shifted binary transmission encoding. An exclusive or gate XOR with feedback normally is used. The feedback signal is to be delayed by exactly one bit length. Such delay either is performed by a delay element $\Delta T$ or by a flip-flop FF1 clocked with a frequency corresponding to the bit rate.

The circuit comprising the delay element $\Delta T$ illustrates the coding rule. This circuit is not suited for on-chip solutions due to technological delay variations. For discrete realizations the delay has to be adjusted very exactly when the bit-rate is high.

The circuit comprising the two flip-flops FF1 and FF2 being one-edge triggered D flip-flops take the input signal exactly with the raising edge of the clock signal Clk. Due to the delay of the exclusive or gate XOR the second input of the upper flip-flop FF1 is not available at the rising edge time; the past result OUT_FF is stored. This results in a delay of the duration of one bit.

The used one-edge triggered D flip-flops FF1 and FF2 are shown in detail in prior art FIG. 3. There, the symbol with the inputs D and C and the output Q, in the upper right is decomposed using logic gates.

Facing the problem of realizing a fast phase shifted binary transmission one is confronted with prior art circuitries being either are too inexact or too slow. The delay of the feedback is to be very short, but nevertheless quite exact. Delay elements are inexact due to technological variations and flip-flops are too slow.

BRIEF DESCRIPTION OF THE INVENTION

In order to ensure the operation of a phase shifted binary transmission coder, the input signal too is to be read in via a transparent D flip-flop. The maximum codable bit rate is limited by the delay in the exclusive or gate. The read-in pulse of the transparent D flip-flops is to lie within one bit of the input signal and is to be shorter than the delay within the exclusive or gate. The basic idea behind this invention is to use transparent D flip-flops instead of one-edge triggered D flip-flops. Transparent D flip-flops shown e.g. in FIGS. 5 and 6, are primitive flip-flops having the property when the input C which is the input below the dashed line, is 0 holding the output Q and when the clock input C is 1 propagating the changes on the input D above the dashed line immediately.

The delay of a one-edge triggered D flip flop is larger than the delay of a simple transparent D flip flop, shown in prior art FIGS. 5 and 6 due to the fact that the circuit depth of a one-edge triggered D flip flop is larger than that of a transparent D flip-flop. Hence the maximum bit rate of the circuit using transparent D flip flops instead of the more complex one-edge triggered D flip-flops is larger.

Prior art FIG. 5 shows the symbol and the circuit composition of a transparent D flip-flop according to FIG. 3. Prior art FIG. 6 shows a technical realization of a transparent D flip-flop accordingly.

The basic idea behind this invention is to use transparent D flip-flops instead of one edge triggered D flip-flops. Transparent D flip-flops shown e.g. in FIGS. 5 and 6, are primitive flip-flops having the property when the input C which is the input below the dashed line, is 0 holding the output Q and when the clock input C is 1 propagating the changes on the input D above the dashed line immediately.

OBJECTS AND ADVANTAGES OF THE INVENTION

The invention is a phase shifted binary transmission encoder with a data input and a data output, where the phase shifted binary transmission encoder includes an exclusive or gate having two inputs and an output, the output of the exclusive or gate being the output of the phase shifted binary transmission encoder, where one input of the exclusive or gate is connected with the output via a first flip-flop and the other input of the exclusive or gate is connected with the data input via a second flip-flop, both flip-flops being connected with a clock input, wherein the flip-flops are transparent D flip-flops.

Furthermore the invention is a phase modulator comprising the phase shifted binary transmission encoder and an optical network element comprising such a phase modulator for phase shaped binary transmission.

Accordingly, it is an object and advantage of the present invention to encode high bit-rates, e.g. grater than 10 GBit/s. A clock signal corresponding to the bit rate is necessary having 40 GBit/s, i.e. 40 GHz.

Another advantage of the present invention is that the delay is independent of the bit rate, i.e. the circuitry operates over a large frequency range.

These and many other objects and advantages of the present invention will become apparent to those of ordinary skill in the art from a consideration of the drawings and ensuing description.

DETAILED DESCRIPTION OF THE INVENTION

Those of ordinary skill in the art will realize that the following description of the present invention is illustrative only and is not intended to be in any way limiting. Other embodiments of the invention will readily suggest themselves to such skilled persons from an examination of the disclosure.

Figure 1:
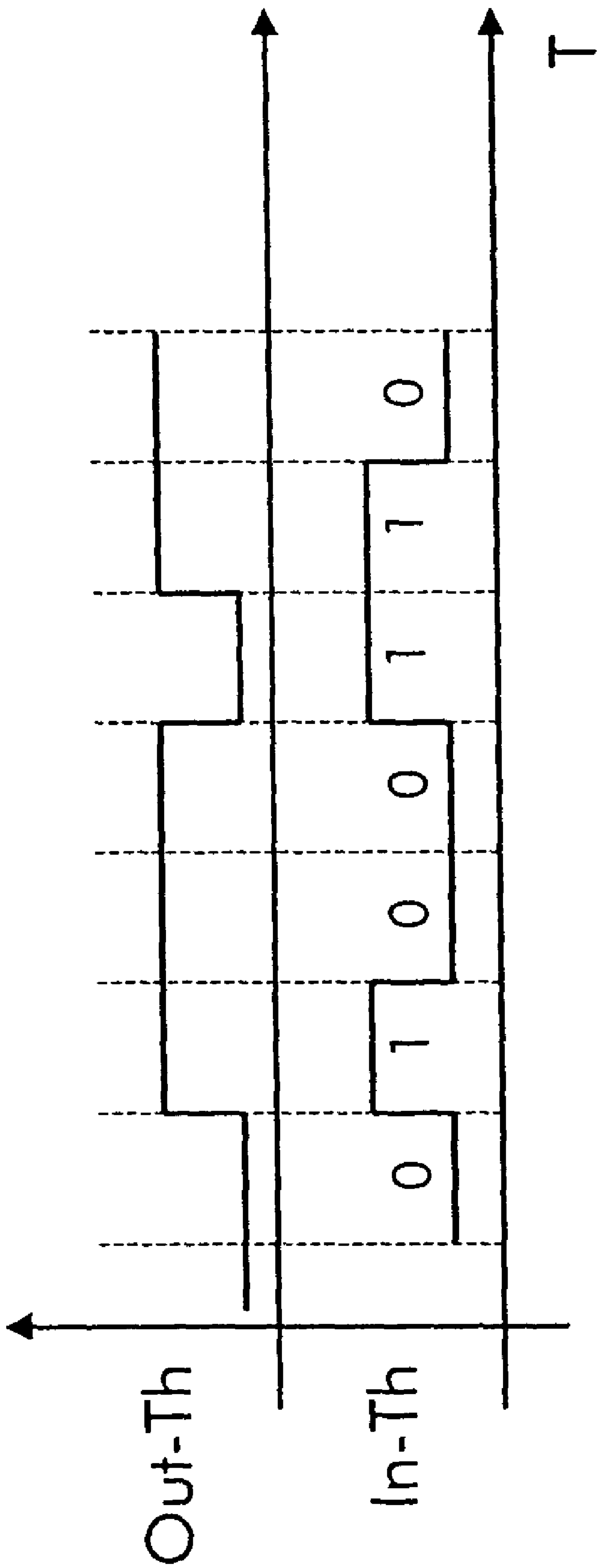
FIG. 1 is a schematic drawing of encoding a signal using phase shifted binary transmission.
Figure 2:
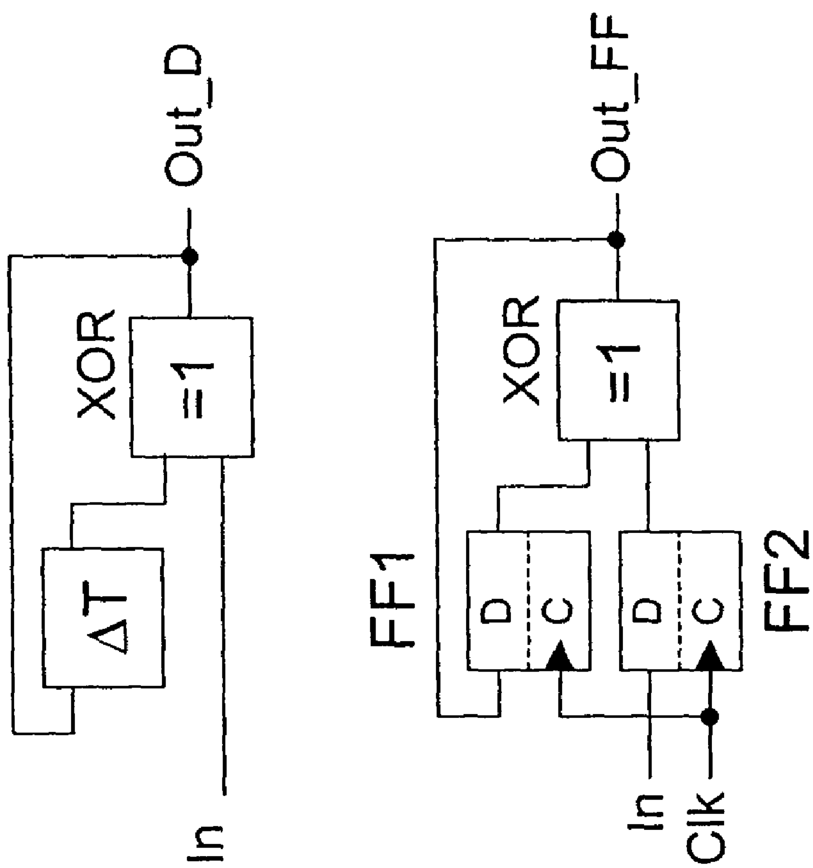
FIG. 2 is a schematic drawing of prior art circuitries.
Figure 3:
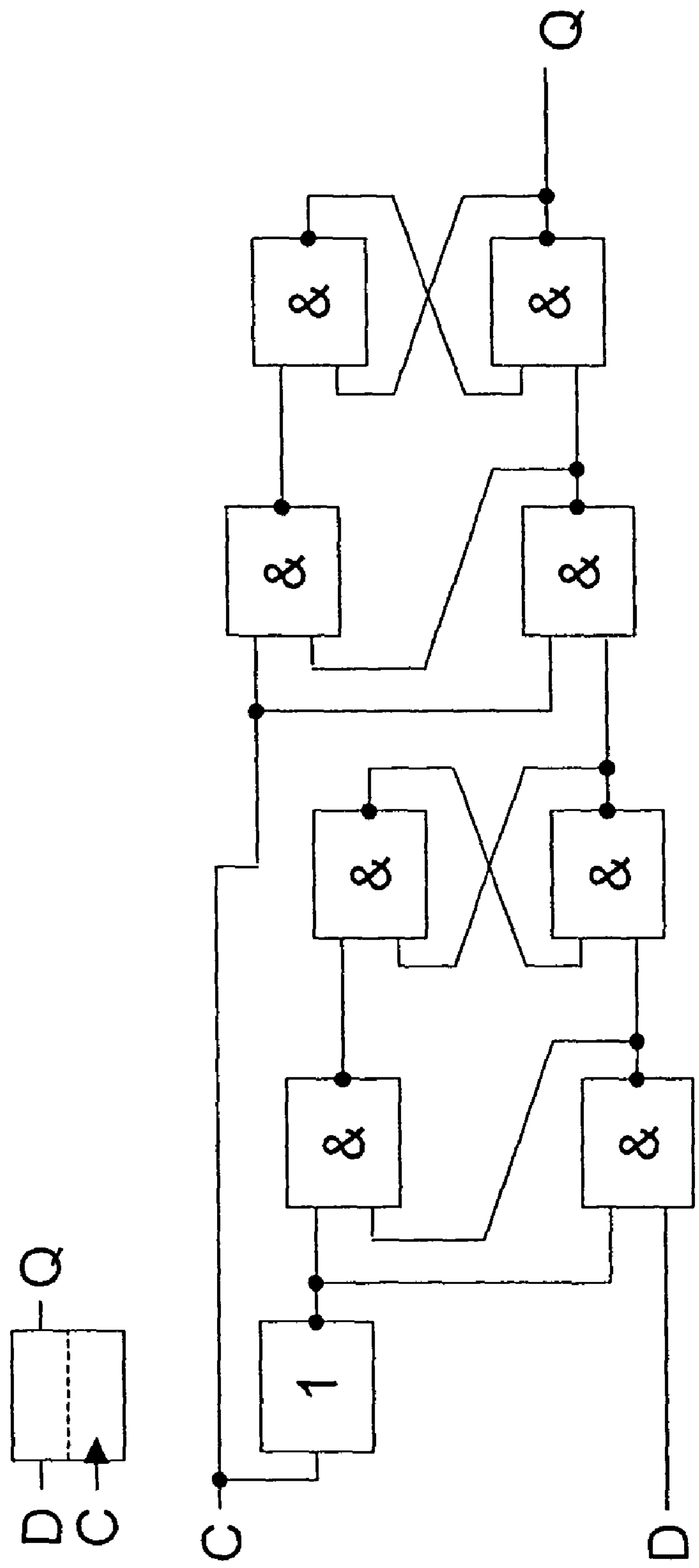
FIG. 3 is a schematic drawing of a prior art circuitry of a one-edge triggered D flip-flop.
Figure 4:
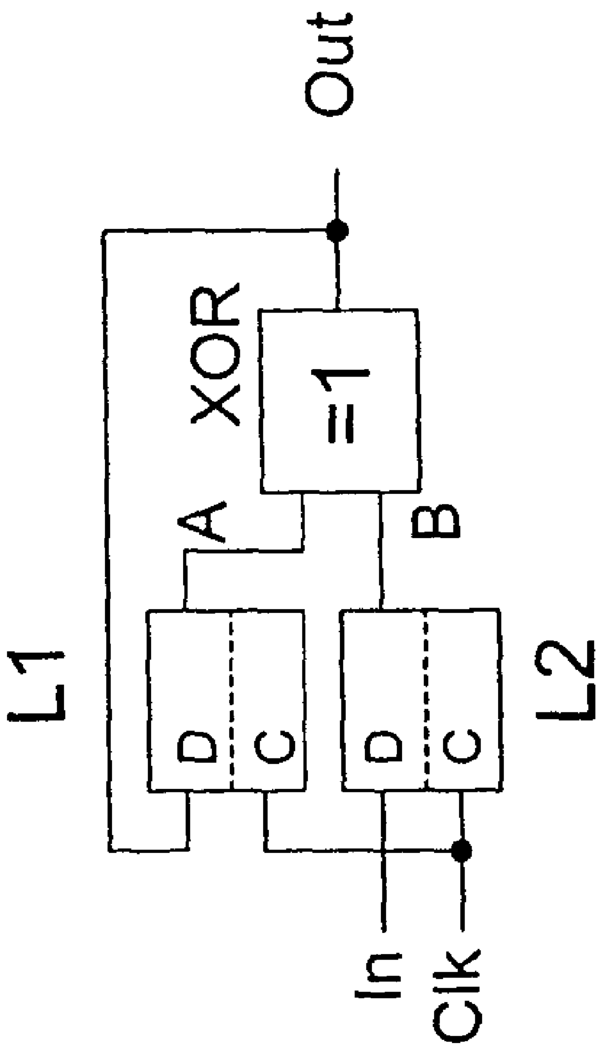
FIG. 4 is a schematic drawing of the circuitry according to the invention.
Figure 5:
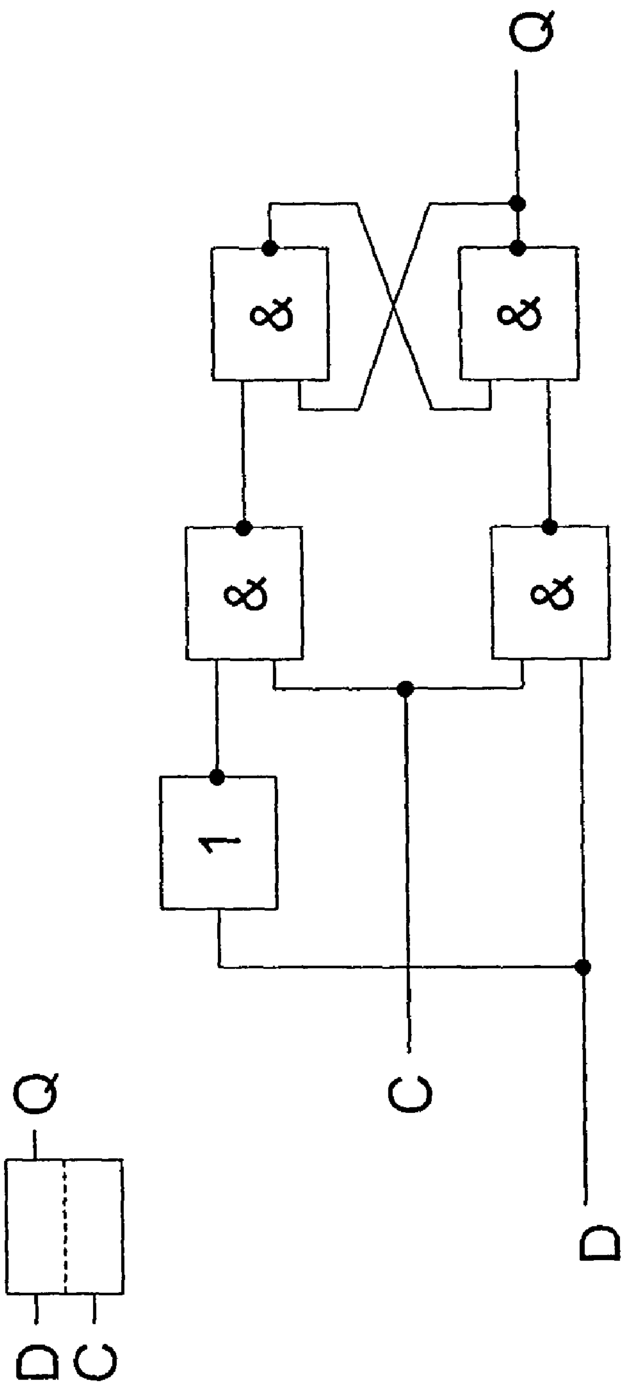
FIG. 5 is a schematic drawing of a prior art circuitry of a transparent D flip-flop.
Figure 6:
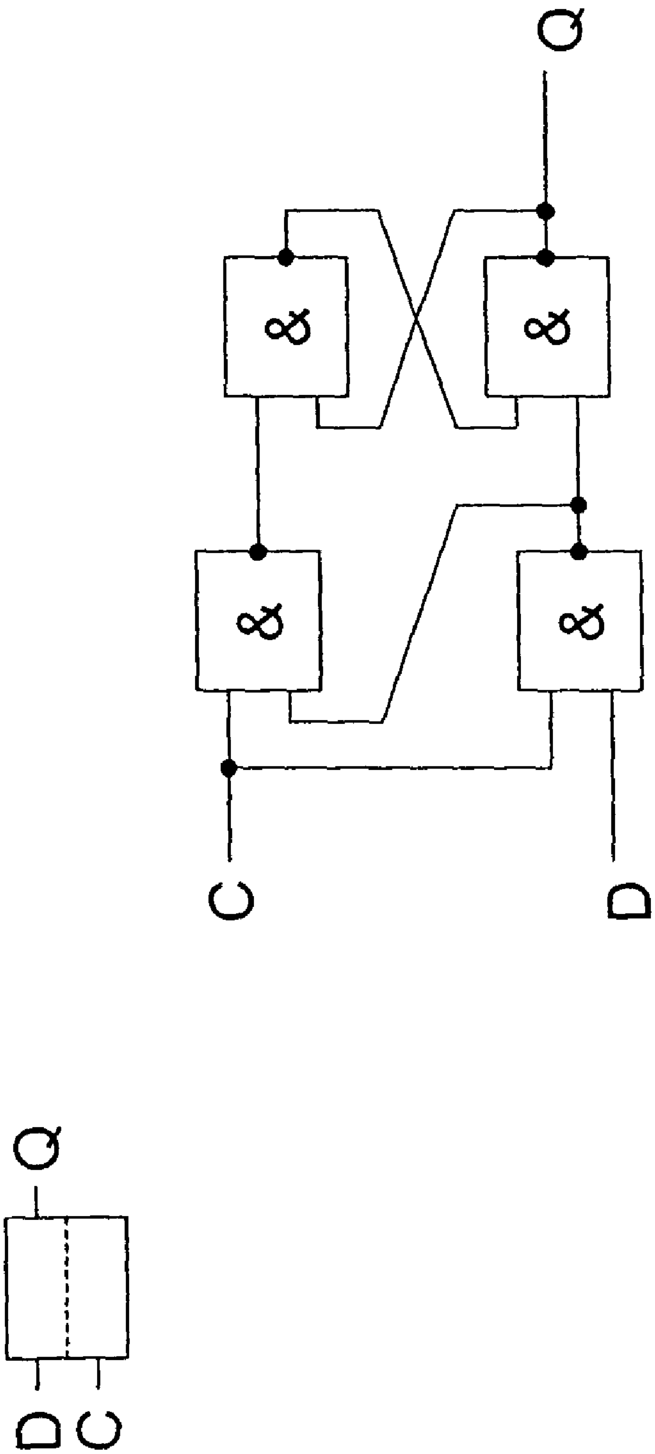
FIG. 6 is a schematic drawing of a prior art circuitry of a technical realization of a transparent D flip-flop.

FIG. 4 shows the circuitry according to the invention. The circuitry comprises an exclusive or gate XOR and two transparent D flip-flops, an upper transparent D flip-flop L1 and a lower transparent D flip-flop L2. The circuitry has in input In, a clock input Clk, and an output Out.

The clock input Clk is connected with the transparent D flip-flop clock input C of both transparent D flip-flops L1 and L2. The input In is connected with the input D of the lower transparent D flip-flop L2. The lower transparent D flip-flop L2 has the lower transparent D flip-flop output B. The output Out is connected with the input D of upper transparent D flip-flop L2. The upper transparent D flip-flop has the upper transparent D flip-flop output A. Both transparent D flip-flop outputs A and B are connected with the exclusive or gate XOR. The output of the exclusive or gate XOR is the output Out of the circuitry.

Figure 7:
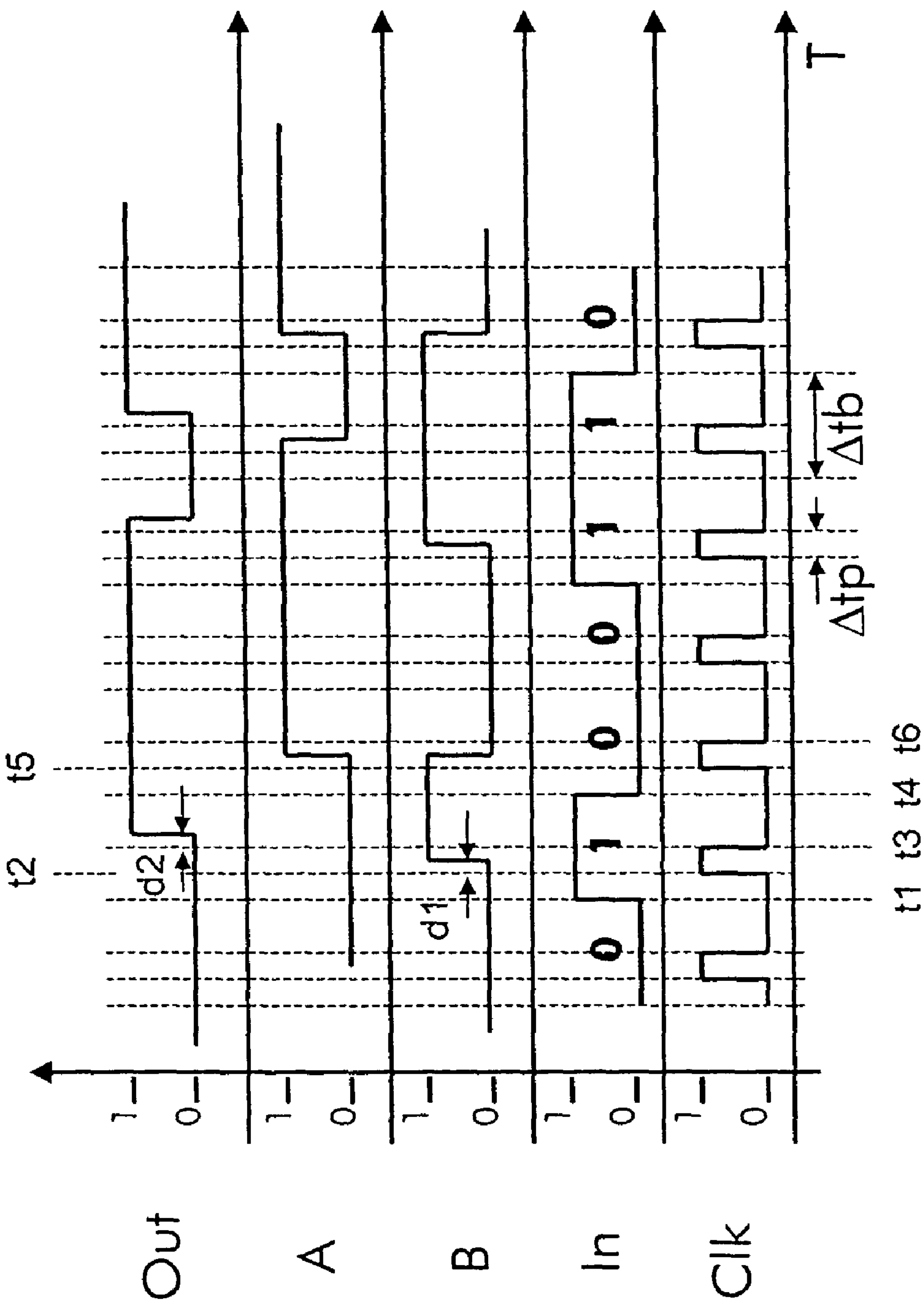
FIG. 7 is a schematic drawing of a time diagram illustrating the function of the circuitry according to the invention.

FIG. 7 shows a coordinated time diagram of the circuitry shown in FIG. 4. Signal values for the input In, the clock Clk, the intermediate transparent D flip-flop outputs, the lower transparent D flip-flop output A and the lower transparent D flip-flop output B, and the output Out. There are five points on the x-axis T; the first time point t1, the second time point t2 the third time point t3, the fourth time point t4, and the fifth time point t5.

The signal values correspond to logical values 0 and 1 as indicated on the y-axis in the figure. The diagram shows the encoding of the bit sequence 0100110. The vertical dashed lines illustrate triggering time points.

At a first time point tithe input signal In is 1 and the state of the transparent D flip-flops is such that the lower transparent D flip-flop output B and the upper transparent D flip-flop output A is 0. Since the clock Clk is 0 the transparent D flip-flop outputs A and B and the output Out do not change. When the clock Clk changes to 1 at the second time point t2, after a first delay d1, the transparent D flip-Hop's latency, the output value B of the lower transparent D flip-flop is 1. The upper transparent D flip-flop output A remains on 0 since the input value Out of the upper transparent D flip-flop L1 did not change. At the third time point t3, the clock Clk falls on 0, ensuring that the outputs of the transparent D flip-flops are stable; the upper transparent D flip-flop output A is 0, the lower transparent D flip-flop output is 1. Then, after a second delay d2, the gate latency, the exclusive or gate produces a 1 at the output Out.

At the fourth time point t4, the input In falls on 0 having no effect on the output Out since the transparent D flip-flops' state remain. Raising the clock Clk at the fifth time point t5 has the effect that the inputs of the transparent D flip-flops are propagated to the outputs of the transparent D flip-flops, i.e. after a short delay, the same as the first delay d1, the lower transparent D flip-flop output B falls on 0 and the upper transparent D flip-flop output A raises on 1. The change of both input of the exclusive or gate XOR has no effect on the result, hence after a stable input at the last labeled time point t6, ensured by the clock value 0, and after a delay corresponding to the second delay d2, the output Out remains 1.

To ensure the correct functionality the duration Δtp when the clock Clk is 1 should be less than the delay d2 of the exclusive or gate XOR. Furthermore it is preferable to place the clock pulse within a bit time interval Δtb as indicated in FIG. 4.

ALTERNATIVE EMBODIMENTS

Although illustrative presently preferred embodiments and applications of this invention are shown and described herein, many variations and modifications are possible which remain within the concept, scope, and spirit of the invention, and these variations would become clear to those of skill in the art after perusal of this application.

Although originally designed for optical transmission and realization by integrated circuits, the invention can be used with any type for signal encoding. For instance it might be useful to combine multiple phase shifted binary transmissions with a phase delay by reusing the invention in a cascaded way.

What is claimed is:

1. A phase shifted binary transmission encoder with a data input and a data output, where the phase shifted binary transmission encoder comprises:

an exclusive OR gate comprising two inputs and an output, the output of the exclusive OR gate being the data output of the phase shifted binary transmission encoder, and first and second transparent D flip-flops connected to a clock input, wherein one input of the exclusive OR gate is connected with the data output via the first flip-flop and the other input of the exclusive OR gate is connected with the data input via the second flip-flop, wherein a read-in pulse of the first and second flip-flops lies within one bit of the data input signal and is shorter than the delay within the exclusive OR gate.

2. A phase modulator comprising the phase shifted binary transmission encoder according to claim 1.

3. An optical network element comprising a phase modulator according to claim 2 for phase shaped binary transmission.

* * * * *